(12) United States Patent
Zhun et al.

(10) Patent No.: US 7,633,910 B2
(45) Date of Patent: Dec. 15, 2009

(54) METHOD AND APPARATUS FOR SMOOTH DISASSOCIATION OF STATIONS FROM ACCESS POINTS IN AN 802.11 WLAN

(75) Inventors: Zhong Zhun, Croton-On-Hudson, NY (US); Amjad Soomro, Hopewell Junction, NY (US); Stefan Mangold, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 476 days.

(21) Appl. No.: 10/555,051

(22) PCT Filed: Apr. 22, 2004

(86) PCT No.: PCT/IB2004/001304
§ 371 (c)(1),
(2), (4) Date: Oct. 28, 2005

(87) PCT Pub. No.: WO2004/098108
PCT Pub. Date: Nov. 11, 2004

(65) Prior Publication Data
US 2006/0227731 A1 Oct. 12, 2006

Related U.S. Application Data

(60) Provisional application No. 60/466,575, filed on Apr. 30, 2003, provisional application No. 60/503,712, filed on Sep. 17, 2003.

(51) Int. Cl.
*H04Q 7/24* (2006.01)

(52) U.S. Cl. .................. 370/338; 370/328; 370/310; 455/418

(58) Field of Classification Search .............. 370/328, 370/338, 331, 310; 455/434, 433, 418
See application file for complete search history.

(56) References Cited

U.S. PATENT DOCUMENTS 5,467,341 A 11/1995 Matsukane (Continued)

FOREIGN PATENT DOCUMENTS

EP 0 851 633 A2 7/1998

OTHER PUBLICATIONS

Information Technology—Telecommunications and Info. Exchange between Systems—Local & Metropolitan Area Networks—Specific Requirements—Part II; Wireless Lan Medium . . . , 1999.

*Primary Examiner*—Danh C Le
(74) *Attorney, Agent, or Firm*—Larry Liberchuk

(57) ABSTRACT

A plurality of methods, apparatus and computer program for providing warning to a station (STA) associated with an Access Point (AP) in a WLAN that a disassociation the AP is imminent. The steps include (a) selecting a station (STA) for disassociation from a particular Access Point (AP) of a WLAN; (b) by updating a newly created reason code field of a message to indicate to the selected STA that it has become a candidate for disassociation; and (c) transmitting the message to the selected STA. Upon receipt by the STA of a message indicating that the selected STA has become a candidate for disassociation, the selected station scans other Access Points from a list to find another Access Point to associate with before being cut off by the current Access Point.

9 Claims, 4 Drawing Sheets

U.S. PATENT DOCUMENTS

| | | |
|---|---|---|
| 5,732,347 A | 3/1998 | Bartle |
| 6,466,608 B1 * | 10/2002 | Hong et al. .................. 375/137 |
| 7,016,948 B1 * | 3/2006 | Yildiz ........................ 709/221 |
| 2003/0134642 A1 * | 7/2003 | Kostic et al. ................. 455/450 |
| 2004/0018839 A1 * | 1/2004 | Andric et al. ............... 455/433 |
| 2004/0103278 A1 * | 5/2004 | Abhishek et al. ............ 713/160 |

* cited by examiner

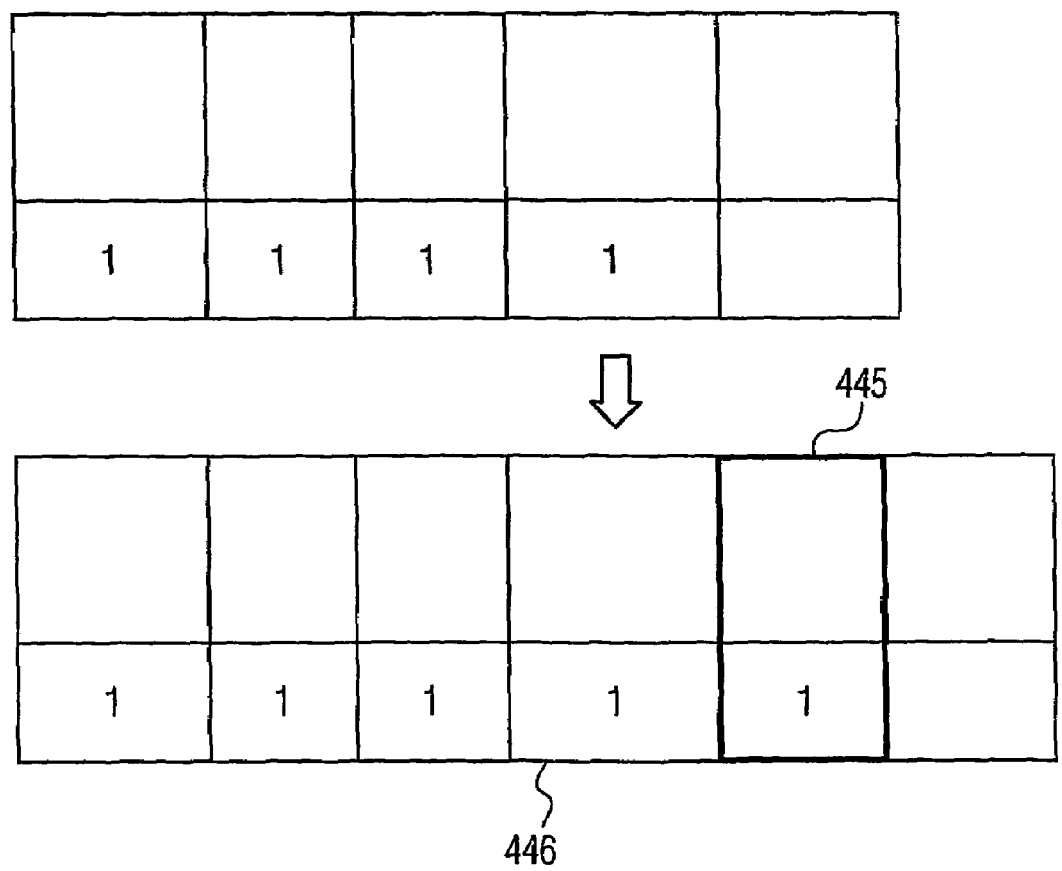

METHOD AND APPARATUS FOR SMOOTH DISASSOCIATION OF STATIONS FROM ACCESS POINTS IN AN 802.11 WLAN

CROSS REFERENCE TO RELATED APPLICATION

This application claims the benefit of U.S. Provisional Application Ser. No. 60/466,575 filed Apr. 30, 2003 and U.S. Provisional Application Ser. No. 60/503,712 filed Sep. 17, 2003 both of which are incorporated herein by reference.

The present invention relates to IEEE 802.11 and its Access Points (AP) and Stations (STA). More particularly, the present invention relates to a method for the Access Points to disassociate from STAs in a "friendly" manner.

A method for wireless communication has been proposed for 802.11. An infrastructure of a Basic Service Set (BSS) of IEEE 802.11 WLAN is composed of an Access Point (AP) and a number of stations (STAs) associated with the AP. The AP connects the stations to the infrastructure.

Load balancing of the (STAs) to the APs is an important objective in order to permit a WLAN network to operate efficiently. The overloading of some APs with (STAS) can lead to increased network response time, disconnects, etc., particularly if there are APs that are under utilized, in order to optimize response time and improve overall efficiency and dependability of the WLAN, load balancing shifts (STAs) to less-utilized APs so as to even out the workload among the APs.

For example, FIG. 1 illustrates load balancing as known in the art, and utilized by the present invention. Circle 100 represents a coverage area of the first AP 110, wherein all the STAs in that coverage area are being served by the first AP 110. Circle 200 similarly represents a second coverage area associated with Access Point 210. All of the STA's within the coverage 200 are capable of being serviced by the AP 210.

According to the particular example in FIG. 1, there are a total of eight STAs 105 associated with AP 110 while only one STA 205 is associated with AP 210. This shows a clearly unbalanced load. To perform load balancing, any number of the STAs 105a in the intersection area 215 of the two circles can be disassociated from AP 110, stopping their communication and forcing them to look to associate with AP 210. If AP 210 can handle the STAs 105a, the packets are handed-off to the newly associated AP 210. In this particular example, three STAs referenced as 105a will be disassociated from AP 110 and associated with AP 210 so that there is a five to four ratio of STAs associated with AP 110 versus AP 210.

Under 802.11, the only mechanism for the AP to perform load balancing is to issue a disassociation to the STAs it does not want to service anymore via receipt of a Disassociation Action Frame. The STA is abruptly disconnected, and must find another AP for servicing a.s.a.p. Again, under the current protocol, disassociation is an abrupt action because the STAs that are about to be disassociated have no forewarning that they are about to become disconnected from a particular AP. Therefore, when the AP disassociates a particular STA or STAs, it is common that the resulting is that the STA suffers from a service disruption and loss of packets during handoff, as the STAs are forced to stop communication immediately and look for other APs with which to associate.

Furthermore, the latest draft D0.5 of 802.11 Task Group k (TGk) provides for two types of messages that are communicated from the APs to the STAs. These messages are the Measurement Request Frame and the Site Report Response message. The Measurement Request is initiated by the AP and it requests the receiving STAs to provide certain measurements about the radio environment. Conversely, the site report response message is normally sent by the AP in response to the site report request from the STAs.

AP can also send autonomous site report without being requested by the STAs, whenever it sees the need of updating the site report information. The site report provides an overall picture of the neighborhood information, and includes a list of neighboring APs. The neighboring APs on the list are the ones which the STA will try to associate with should a handoff occur.

The present invention provides a mechanism for an AP to send a Disassociation Candidate indication to the STAs before issuing the Disassociation Action. The invention utilizes two existing protocol messages as a carrier, namely either the measurement request frame or the site report response frame, and creates a Reason Code field. The warning that the STA is a Disassociation candidate is arranged in the newly created Reason Code field. The invention permits increased reliability in uptime for the STA's without requiring a radical change to the hardware and/or software used in the 802.11 WLAN. Either the site report response or the measurement request frames can serve as a carrier of the Disassociation warning message.

FIG. 3 is a chart listing the reason codes for Measurement Request according to the present invention.

FIG. 4 is a diagram of a site report response frame containing a reason field according to the present invention.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

The instant inventors are referring to the invention as a "friendly disassociation" because it is not an abrupt cutoff as are current disassociations that often result in lost packets, etc. The STA that is selected for disassociation is referred to as a "disassociation candidate" because sometime in the near future, the candidate will be disassociated from the current AP. However, unlike abrupt disassociations, the present invention gives forewarning to the particular STA that it is a disassociation candidate, so that the STA can look for another AP before becoming disconnected from the WLAN. The measurement request frame and/or the site response report, both of which currently exist under 802.11k, are modified to become a carrier of the message advising the particular STA that it has been designated as a disassociation candidate.

Figure 1:
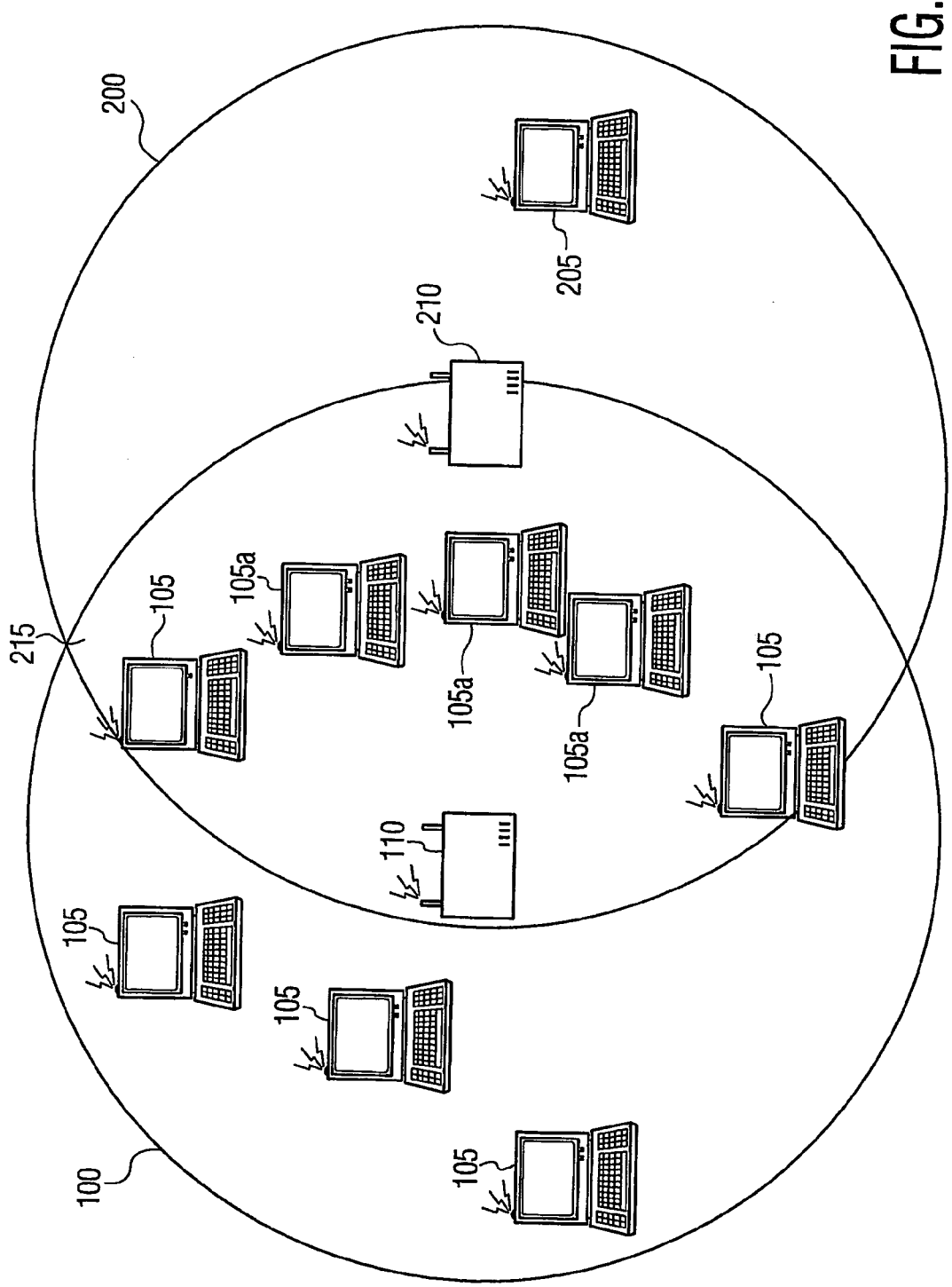
FIG. 1 is a Venn diagram showing load balancing among two access points according to both the prior art and the present invention.
Figure 2:
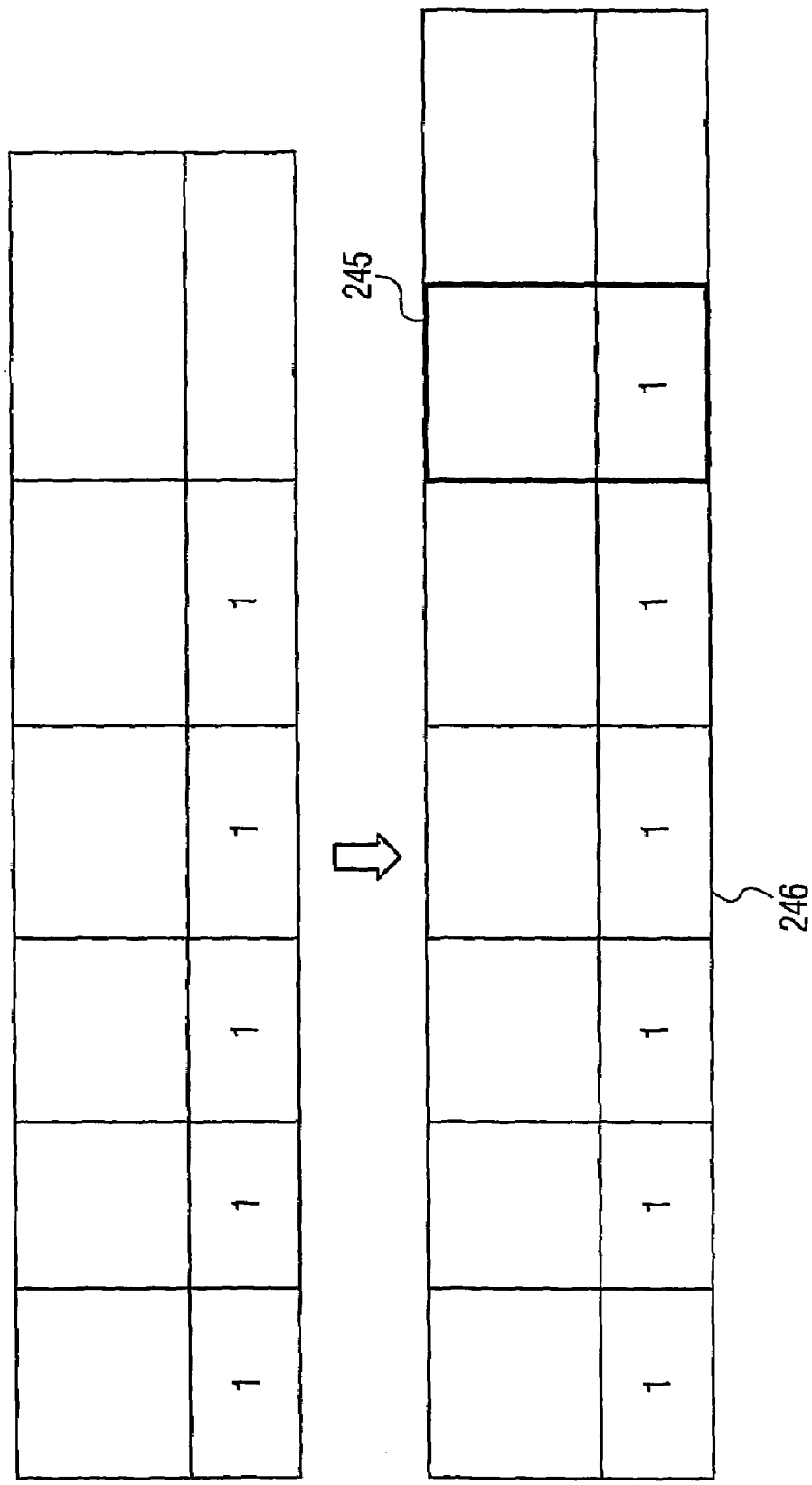
FIG. 2 is a diagram of a measurement request frame containing a reason field according to the present invention.

FIG. 2 shows a measurement request frame under the latest draft of IEEE 802.11k. The latest draft permits STA to deny the request from the BSS to do measurement about the environment. The measurement request frame has added a reason field that provides the requested STA with additional information to determine the degree of urgency of the request. If the request is extremely urgent, the STA can be programmed to accept the request from the BSS because it is having a problem and disassociation might be imminent.

In addition, FIG. 2 illustrates that a measurement request frame contains a Reason Field 245, which in the present example, has bits reserved (from 0 to 255) for different conditions.

According to the present invention, it is proposed that one of the Reason field codes identifies a disassociation candidate, so that when the STA receives the measurement request frame the STA can be forewarned that they are about to disassociated from the current AP in the near future. In other words, the STA is being told ahead of time to expect receipt of a Disassociation Action Frame.

As shown in FIG. 3, in the present example of a Reason Code field, a "1" identifies that the STA receiving the measurement request frame is a disassociation candidate. A person of ordinary skill in the art knows that any one of the numbers in the range of the Reason field could be set aside to indicate this information, such as number 6, or 61, or 242, etc., but for ease of explanation, a 1 has been chosen.

Once the STA receives the forewarning that they have been selected as a disassociation candidate, the STA is provided time to scan for other APs to associate with before being disassociated via the Disassociation Action Frame. It should be noted the Reason Code indicates that disassociation is imminent and the activation delay field 246 (shown in FIG. 2) can specify the time the STA has before it will be disassociated from the current AP.

FIG. 4 shows another way that the reason code could be provided to the STAs as a forewarning that a disassociation is imminent. Instead of the measurement request frame, the reason code 445 can be inserted in the site report response frame. The reason code field here also has a range of 0-255 bits. Again, the activation delay field 446 can be used to specify the time the STA has before disassociation, when the Reason Code indicates that disassociation is imminent.

Figures 5, 6:
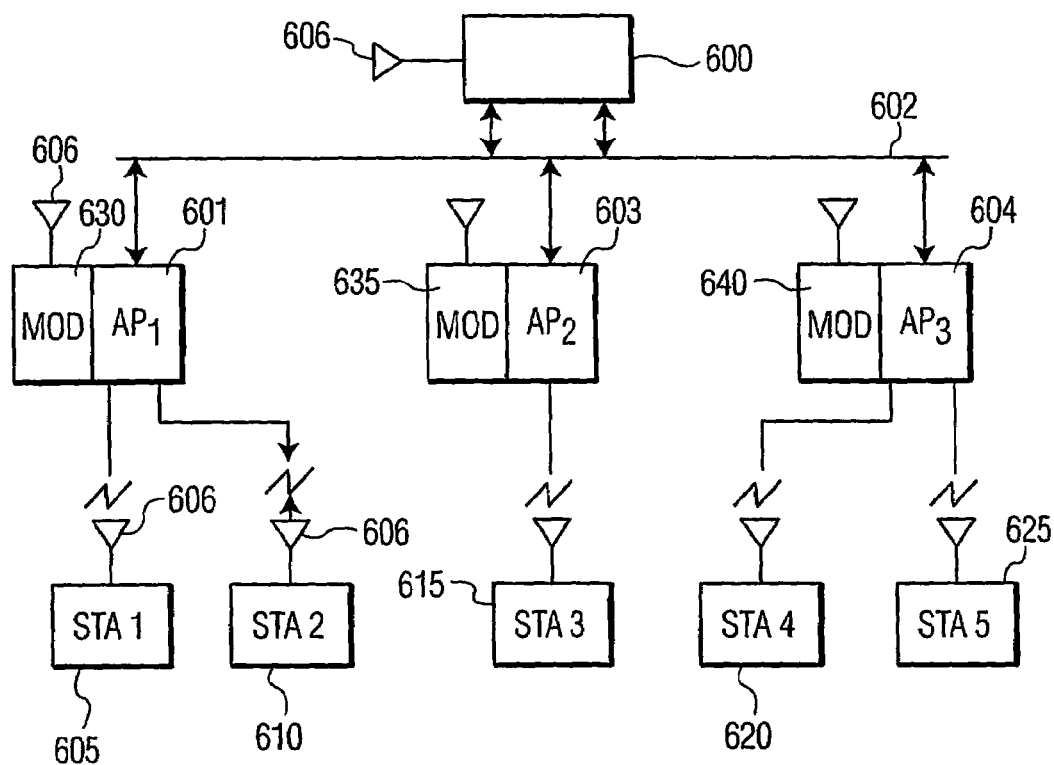
FIG. 5 is a chart listing the reason codes for a Site Report Response according to the present invention.
FIG. 6 illustrates an example of hardware that can be used to perform the present invention.

FIG. 6 illustrates an example of hardware that could be used to perform the present invention. As server 600 is typically hardwired to a bus 602, as are Access Points API (601), AP2 (603), AP3 (604). It is possible that the server 600 has wireless transmission capability (As evidenced by antenna 606) and foregoes the hardwired (a.k.a. electrical, optical) bus to communicate with the Access Points (also shown to have antenna 606).

A module 630, 635, 640 is arranged in AP1, AP2, AP3, respectively that stores the computer code to update a measurement request frame or a site report response in the reason code field to select a candidate for disassociation (chosen from respective STAs 605,610, 615,620,625 by the respective AP).

According to one aspect of the invention, the measurement request frame or site report response frames can be generated at a module 630, 635, 640 of the APs 601, 603, 604, or received by a module 630, 635, 640 of the APs 601, 603, 604 from the server 600, and can be updated to include disassociation if such a selection is warranted. The STA typically scans all the APs on a list that is part of the site report response to look for an AP that will service the STA. When an AP is found, there can be a handoff between the current AP of the respective STA and a future AP. Alternatively, if the time is critical, there may be time only to scan a single site and request connection.

Thus, the AP generates the actual frame and includes the reason code indicating the selected disassociation candidate. It is also possible to have certain default backup APs assigned, so that when STA3 receives a disassociation candidate message, it automatically scans a particular AP assigned as a default.

There are other frames that are transmitted between APs and STAs that could be modified to contain the reason code so as to permit friendly disassociation messages. It should be understood that various modifications may be made to the present invention that does not depart from the spirit of the invention or the scope of the appended claims. For example, the number of APs, STA, etc can all be changed for need. In addition, while the ability to load balance without disconnecting STAs from service is one aspect of the present invention, the present invention also provides a method for an STA attached to an intermittently failing AP to receive a message indicating that it should scan other APs for a disconnect may be imminent.

The invention claimed is:

1. A method of providing a warning that a disassociation from an Access Point of a Wireless Local Area Network (WLAN) is imminent, comprising:
   selecting a station for the disassociation from the Access Point of the WLAN;
   updating a reason code field of one of one of (i) a measurement report message; and (ii) a site report response message to indicate the selected station that has become a candidate for disassociation; and
   transmitting the message with the updated reason code field to the selected station, wherein the message is updated by including a numerical value in the reason code field that identifies the station as a disassociation candidate, and wherein the value is selected from a plurality of possible values, each value corresponding to a particular reason for notifying the station.

2. The method according to claim 1, further comprising identifying in an activation delay field of the message an indication of a time period in which the disassociation will occur.

3. The method according to claim 1, wherein the station scans at least one Access Point other than said Access Point to associate with.

4. The method according to claim 1, wherein the station scans all of the Access Points in a list provided to the station.

5. The method according to claim 1, wherein the WLAN includes an IEEE 802.11 local area network.

6. The method according to claim 1, further comprising:
   sending a Disassociation Action Frame to the station to end communication with said Access Point.

7. A computer program, embedded in a computer readable medium, for providing a warning that a disassociation from an Access Point of a Wireless Local Area Network (WLAN) is imminent, comprising:
   selecting a station for the disassociation from the Access Point of the WLAN;
   updating a reason code field of one of (i) a measurement report message; and (ii) a site report response message to indicate the selected station that has become a candidate for the disassociation; and
   transmitting the message with the updated reason code field to the selected station, wherein the message is updated by including a numerical value in the reason code field that identifies the station as a disassociation candidate, and wherein the value is selected from a plurality of possible values, each value corresponding to a particular reason for notifying the station.

8. The computer program according to claim 7, further comprising:
   sending a Disassociation Action Frame to the selected station after a predetermined period of time.

9. A system for providing a disassociation warning in a Wireless Local Area Network (WLAN), comprising:

a station for disassociating in the WLAN; and
an Access Point for updating a reason code field of one of (i) a measurement report message; and (ii) a site report response message that indicates the station that is a candidate for disassociation, said Access Point transmitting the message with the updated reason code field to the station, wherein the message is updated by including a numerical value in the reason code field that identifies the station as a disassociation candidate, and wherein the value is selected from a plurality of possible values, each value corresponding to a particular reason for notifying the station.

* * * * *